United States Patent [19]

Kimzey

[11] 4,323,734

[45] Apr. 6, 1982

[54] INTERFACE CIRCUIT FOR TELEPHONE LINE TO EQUIPMENT SIGNAL COUPLING

[75] Inventor: Gene A. Kimzey, Graham, Wash.

[73] Assignee: Crest Industries, Inc., Puyallup, Wash.

[21] Appl. No.: 150,199

[22] Filed: May 15, 1980

[51] Int. Cl.³ .............................................. H04Q 5/20
[52] U.S. Cl. ........................... 179/18 FA; 179/99 LS; 179/99 LC
[58] Field of Search .............. 179/18 F, 18 FA, 99 R, 179/99 LC, 70, 77, 81 R, 99 H, 16 AA

[56] References Cited

U.S. PATENT DOCUMENTS

| | | | |
|---|---|---|---|
| 3,772,477 | 11/1973 | Richards | 179/18 FA |
| 4,020,294 | 4/1977 | Kitasewski et al. | 179/18 FA |
| 4,056,691 | 11/1977 | Freimanis et al. | 179/18 FA |
| 4,079,208 | 3/1978 | Rogers et al. | 179/18 FA |
| 4,087,646 | 5/1978 | Brolin et al. | 179/18 FA |
| 4,099,032 | 7/1978 | Roge et al. | 179/18 FA |
| 4,118,597 | 10/1978 | Proctor et al. | 179/18 FA |
| 4,133,985 | 1/1979 | Rasmussen et al. | 179/99 H |
| 4,158,109 | 6/1979 | Diskmans et al. | 179/18 FA |
| 4,281,219 | 7/1981 | Cowpland | 179/18 FA |

OTHER PUBLICATIONS

"Telephone On/Off Hook Detector", IBM Technical Disclosure Bul., vol. 16, No. 5, Oct. 1973, Glowienka and Reiley.

Primary Examiner—Gerald L. Brigance
Attorney, Agent, or Firm—Christensen, O'Connor, Johnson & Kindness

[57] ABSTRACT

A telephone line to equipment interface circuit, characterized by a high degree of input impedance isolation, is provided for coupling supervisory and information signals from the line to signal utilizing equipment, such as a control unit of a key telephone system. The interface circuit incorporates first and second operational amplifier comparators connected in opposed phase relationship to the tip and ring conductors of a telephone line. The inputs of the comparators are biased so as to produce output signals that change in a predetermined and symmetrical fashion, similar to full wave rectification, in response to normal and reverse polarity supervisory signals applied to the telephone line by a Central Office, PBX, ESS or other signal originating equipment. The output signals produced by the first and second comparators are applied to separate inputs of a logic circuit, formed by a third operational amplifier comparator, which is biased to perform an AND logic function. The AND logic output signal from the third comparator is indicative of supervisory and information signal conditions on the telephone line, including on-hook (idle) and off-hook (busy) ringing, and a special hold condition represented by a hold signal generated for local supervisory purposes by the above-mentioned key telephone system.

17 Claims, 5 Drawing Figures

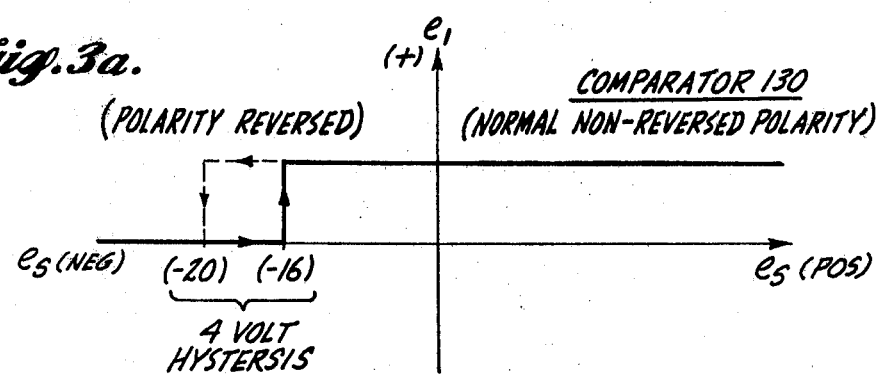
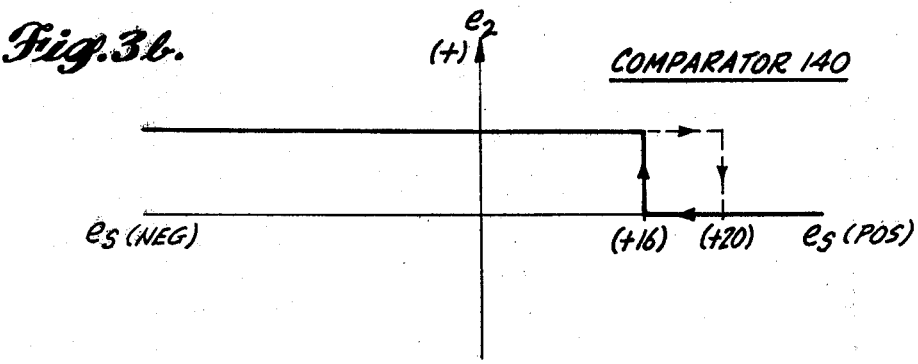
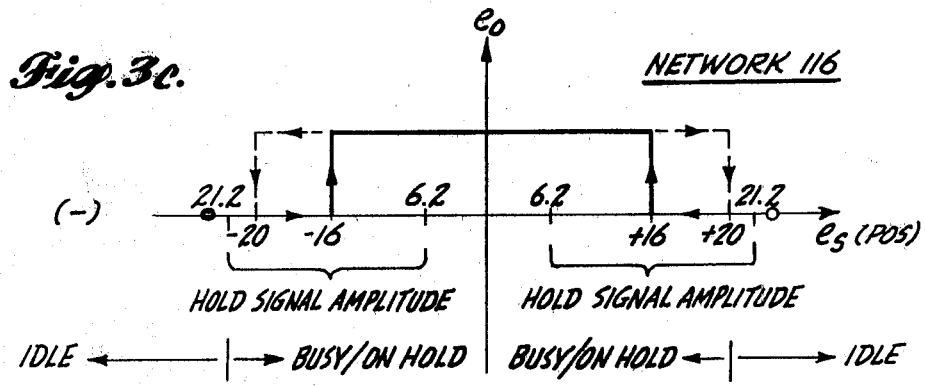

INTERFACE CIRCUIT FOR TELEPHONE LINE TO EQUIPMENT SIGNAL COUPLING

BACKGROUND OF THE INVENTION

The present invention relates to interface circuits for coupling supervisory and information signals appearing on a telephone line with signal utilizing equipment, such as a key telephone system.

When a telephone line is idle (on-hook), i.e., not being used to transmit a telephone call, there is a relatively high open circuit impedance at the telephone set so that very little loop current is drawn from the Central Office battery source. When the line becomes busy (off-hook), a significantly lower terminating impedance is connected across the tip and ring conductors of the line, causing a substantially greater loop current to flow. The increased current indicates that the line is in use, and signals the Central Office of the need for establishing dialing and/or voice signal communication between the telephone set and the Central Office. As used herein, the term Central Office is meant to include other supervisory systems such as PBX and ESS.

To prevent the appearance of a false busy condition at the Central Office, it is important that idle telephone lines provide adequate open loop impedance at the subscriber's station. Yet, there is often a need to permanently or semipermanently couple one or more telephone lines to subscriber's equipment such as a control or receiving circuit that is continuously responsive to supervisory and information signals applied to the line at another location. In order to permanently or semipermanently connect such equipment to the telephone line without significantly lowering the open loop impedance, a condition which might cause a false busy indication, impedance isolation must be provided between the line and the various internal circuits of the connected equipment, and between each of the tip and ring conductors of the line and earth ground.

One way in which this requisite impedance isolation has been previously provided is to connect the telephone line to the signal utilizing equipment through a high input impedance amplifier circuit. The high input impedance, such as may be obtained by an operational amplifier circuit, will provide adequate line to equipment impedance isolation, and still provide an output signal of sufficient strength for proper operation of the signal utilizing equipment. So long as the voltage has a predetermined fixed polarity, proper connection of the tip and ring conductors to the input terminals of the equipment insures that the amplifier circuit will be operated in a forward gain mode.

However, a majority of the telephone systems in current use, do not have a fixed polarity on the tip and ring conductors, but rather, use polarity reversal as one form of supervisory signaling. Also, during installation, it is not always easy to identify the leads and properly hook up the telephone line to the customer's equipment so as to establish the proper phase relationship between the line and the equipment. For these reasons, equipment suppliers almost universally incorporate a full wave diode bridge at the input stage of the subscriber's equipment, so the polarity changes on the line are automatically rectified to apply the telephone signal with the proper phase polarity to the circuitry of the equipment. The proper polarity is thus supplied to the circuitry irrespective of supervisory polarity reversals caused by Central Office, and regardless of inadvertent, misconnection of leads during installation.

The insertion of the full wave diode bridge, however, causes undesirable signal coupling characteristics in at least some applications. For example, where the diode bridge is inserted in front of the coupling amplifier, the input impedance of the amplifier may be of such a high level, e.g., 1 megohm or more, in order to meet the above-mentioned isolation requirements, that the forward current flow through the diode bridge is exceedingly small, and is inadequate to cause the diodes to be biased fully on. With the diodes operating in only a marginally forward biased condition, the signal coupling from the telephone line, through the diode bridge, to the input of the amplifier, tends to be a noisy coupling, introducing unwanted, spurious signal fluctuations at the output of the coupling amplifier.

Furthermore, the existence of the full wave diode bridge between the tip and ring conductors of the telephone line and the input of the operational amplifier, results in a certain amount of impedance unbalance in the termination of the telephone line conductors. Such unbalance in turn causes a differential voltage to develop across the input of the amplifier in response to longitudinal voltages and currents occurring on the telephone line. Ideally, the input of the amplifier should provide a high degree of common mode rejection of such longitudinal voltages and currents; however, the existence of an unbalanced termination at the input to the subscriber's equipment, such as caused by the different conducting states of the individual diodes of the rectifier bridge, allow these longitudinals to appear as spurious differential input voltages to the input amplifier.

While these problems of inadequate forward biasing of the rectifying bridge diodes and the unbalance of the terminating impedance of the line can be tolerated in some applications, other telephone systems require more precision resolution of the line voltages. An example of the latter systems is found in a key telephone system (KTS) of the type disclosed and claimed in U.S. Pat. No. 4,132,860 issued Jan. 2, 1979, to Harry R. Rasmussen for a HOLD CONTROL FOR A KEY TELEPHONE SYSTEM; and in U.S. Pat. No. 4,133,985 issued Jan. 9, 1979. to Harry R. Rasmussen et al. for a KEY TELEPHONE SYSTEM. In the KTS disclosed therein, control circuitry is connected to the telephone line for not only sensing and distinguishing between steady state idle and busy conditions on the line, but also for sensing a special, relatively low amplitude fluctuating hold control signal generated and applied to the telephone line by the KTS for local supervision of the system stations. Because of the nature of the hold control signal and the hold control circuitry that is responsive thereto, the amplitude swing of the hold signal is constrained to a relatively narrow range. Unless the hold control signal is transmitted with a relatively high signal-to-noise ratio from the line through the coupling amplifier of the interface circuit to the control circuit, then less than optimum performance is achieved in some installations.

In addition to the need for reliable sensing and discriminating between busy, idle and hold condition signals, the interface circuit should be capable of reliable coupling of ringing signals in which an AC voltage is superimposed on the direct current supervisory signal. While the superimposed ringing voltage is normally of such a large amplitude, that the interface circuit is capable of accurately sensing and converting large amplitude swings into a satisfactory ring indicating signal, nevertheless, the presence of a superimposed ringing signal does pose certain constraints on the construction and required response characteristics of the interface circuit. Thus, any effort to modify the interface circuit for the purpose of improving the coupling of idle, busy and hold indicating signals from the telephone line to the control unit of the key telephone system must also take into account the intermittent presence of large amplitude superimposed ringing signals.

Accordingly, it is an object of the present invention to provide an improved telephone line to equipment interface circuit characterized by a relatively high input impedance, desirable for isolating supervisory signals on a telephone line from the internal impedance of equipment connected to the line, by the capability of accommodating polarity reversals of the DC supervisory signals on the line, and by a relatively high common mode rejection of longitudinal line voltages and currents.

An additional object of the invention is to provide such an interface circuit capable of sensing and distinguishing between changes of the telephone line voltage that are indicative of idle, busy, holding and ringing conditions, and converting such condition changes into output signals that switch between discrete output levels and that are suitable for further processing by digital control circuitry.

Another object of the invention is to provide an interface circuit having the relatively high input impedance required for line to equipment impedance isolation, and at the same time providing a relatively high signal-to-noise ratio suitable for reliably coupling small amplitude fluctuations in the line voltage indicative of the presence of a hold indicating signal generated by a key telephone system.

Still another object of the invention is to provide such a line to equipment interface circuit that has a symmetrical response to normal and reverse polarity signal conditions on the tip and ring conductors of the telephone line, so as to accommodate polarity reversals of either intentional (supervisory signaling) or unintentional (misconnection) causes.

SUMMARY OF THE INVENTION

In accordance with the foregoing objects, an interface circuit is provided for coupling the tip and ring conductors of a telephone line to equipment, such as a control circuit of a key telephone system, that is responsive to line supervisory and information signals, including line voltage polarity reversals. The interface circuit includes first and second operational amplifier comparators having their inputs coupled to the tip and ring conductors of the telephone line in an opposed phase relationship. An output circuit combines comparison signals produced at the comparator outputs and applies the combined outputs to the utilizing equipment so that irrespective of the polarity of the signal transmitted over the line, the associated supervisory and information content thereof is effectively received by the interfaced equipment.

To condition the oppositely phased inputs of the first and second comparators for detecting a special, on-hold signal produced by a key telephone system of the type having a hold control signal transmitted over the tip and ring conductors of the telephone line, a biasing circuit is connected to the inverting and noninverting inputs of the comparators. The output signals from the comparators are combined in an output logic circuit having the following operating conditions. When the supervisory voltage on the line is at a relatively high level, and indicates an idle (on-hook) condition, then irrespective of the line voltage polarity, an output of the signal combining logic circuit assumes a first output state. When the supervisory voltage on the line is at a relatively low level and indicates a busy (off-hook) condition, then again irrespective of the polarity of such line voltage, the output of the logic circuit assumes a second state, discretely different from the first state. When an on-hold signal is present on the telephone line, the voltage is changing at a predetermined fluctuating rate and at an intermediate magnitude falling between the relatively high and low levels associated with the idle and busy conditions, and responsively the output of the logic circuit produces a signal that fluctuates between the first and second discrete states, and does so irrespective of the polarity of the on-hold signal.

In effect, the oppositely phased operational amplifier comparators, provide a full wave rectification-like response to bipolar voltage changes on the telephone line. The need for a full wave diode bridge rectifier is thus eliminated, and the exceedingly high input impedance to the operational amplifiers is effective to provide the needed degree of impedance isolation between the interfaced equipment and the telephone line, without the accompanying disadvantages that have been found when using a diode rectification bridge. Moreover, the biasing of the inputs of the operational amplifier comparators, results in a stepped response of the comparators that is symmetrical with respect to bipolar changes in the line voltage. When the outputs of the comparators are combined by the above-mentioned logic circuit, the symmetrical, stepped response provides effective discrimination between idle, busy, on-hold and ringing signals.

To provide a complete disclosure of the invention, reference is made to one particular embodiment, shown in the accompanying drawings and described in detail.

BRIEF DESCRIPTION OF THE DRAWINGS

FIGS. 3a, 3b and 3c are waveform diagrams showing the output signal responses of each of the operational amplifier comparators of the interface circuit of FIG. 2, and of a logic circuit that combines the separate output signals from the comparators.

DESCRIPTION

Figure 1:
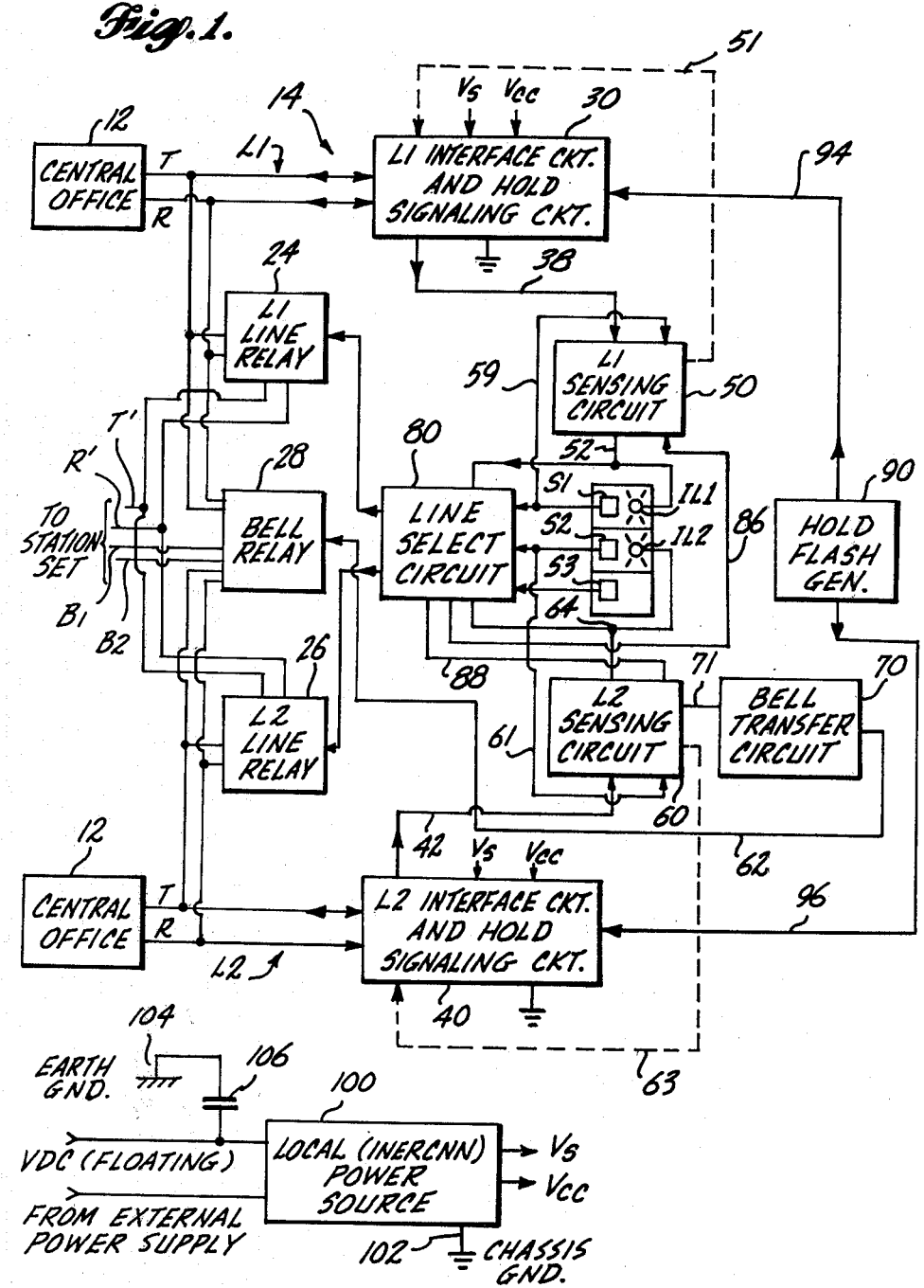
FIG. 1 is a block diagram of the interface circuit in the environment of a key telephone system of the type including an on-hold control circuit.

Although the interface circuit constructed and operating in accordance with the principles of the invention is usable in a wide variety of telephone systems, the circuit has particular utility in a key telephone system of the type shown in FIG. 1, which incorporates on-hold signaling and associated hold control circuitry. Such a key telephone system is more fully described in the above-mentioned U.S. Pat. Nos. 4,132,860 and 4,133,985 and is characterized by the generation of a hold signal in the form of a fluctuating voltage, at any one of a plurality of hold control units, such as unit 14 of FIG. 1, and the receipt of such hold signal at another control unit, identical to unit 14. The receiving control unit responds to the fluctuating hold signal, and produces a hold indication, such as a visual flashing light display. As shown in FIG. 1, L1 interface and hold signaling circuit 30 (and an identical L2 interface and hold signaling circuit 40) provide signal interfacing between the L1 and L2 telephone lines, respectively, and other internal circuitry of control unit 14 which controls the functions of the KTS.

Thus, to understand the following detailed description of interface and hold signaling circuits 30 and 40, a brief explanation of control unit 14 is needed. Control unit 14 as shown in FIG. 1 is one of a number of identical control units connected in parallel to first and second telephone lines L1 and L2 extending from a Central Office 12 (which may also be a private branch exchange—PBX, or an electronic switching system—ESS). In general, control unit 14 is of the type described in the above-mentioned U.S. Pat. Nos. 4,132,860 and 4,133,985, the disclosures of which are incorporated herein by reference. As described in greater detail in these patents, each telephone station has one control unit 14, and unit 14 along with others like it, coordinate the operations of the system using supervisory signals, including a hold control signal, that is transmitted exclusively over the conductors of lines L1 and L2. The various components of control unit 14, other than the improved interface and hold signaling circuits 30 and 40, are fully disclosed in the above-mentioned U.S. patents. Briefly, each control unit 14 includes L1 and L2 line relays 24 and 26 for selectively connecting the tip (T) and ring (R) conductors of either one or both of lines L1 and L2 to the station set over leads T' and R'. A bell transfer relay 28 transfers ringing signals appearing on either of lines L1 or L2 to common output ring leads B1 and B2 which are connected to the bell or other signaling device associated with the station set.

As also described in the above-mentioned patents, control unit 14 includes a sensing circuit 50, a line condition indicating lamp IL1 and a line selector switch S1, both associated with telephone line L1. These components cooperate with supervisory and information signals on line L1 through interface and hold signaling circuit 30.

Similarly, an L2 sensing circuit 60, a line condition lamp IL2 and a line selector switch S2 are associated with telephone L2, and cofunction with line L2 through interface and hold signaling circuit 40. Common to both lines L1 and L2 is a line select circuit 80, which as described in the above-mentioned U.S. patents, provides for coordinating the operation of line relays 24 and 26 in response to sensing circuits 50 and 60, and line selector switches S1 and S2. A hold switch S3 serves to selectively place one or the other of lines L1 and L2 in a hold condition, and associated therewith is a hold signal flash generator 90 that produces a fluctuating signal from a free-running multivibrator which in turn operates the hold signaling portion of circuits 30 and 40 over lines 94 and 96, respectively. The operation of the hold signaling portion of circuits 30 and 40 in response to the outputs of generator 90 is described more fully below. A bell transfer circuit 70 connected by lead 71 to sensing circuit 60, cooperates with bell relay 28 to insure that a ringing signal, incoming on either lines L1 or L2, is applied to the ringer leads B1 and B2.

Interface and hold signaling circuits 30 and 40 in general, enable supervisory and information signals to be applied to and received from each of telephone lines L1 and L2 without adversely affecting the operation of the overall telephone system, including Central Office 12. Sensing circuits 50 and 60 are respectively connected to circuits 30 and 40 by means of connections 38 and 42, and serve to detect the operating conditions on lines L1 and L2: namely, whether the condition is idle (on-hook), busy (off-hook), holding or ringing. Indicator lamps IL1 and IL2, connected to sensing circuits 50 and 60 by means of connections 52 and 64, respectively, display the instantaneous operating conditions, described above, of the respective lines.

Line select circuit 80 is responsive to signals from sensing circuits 50 and 60 via signals received over connections 52 and 64 for controlling the operating states of line relays 24 and 26. Circuit 80 also acts in response to hold switch S3 to develop hold initiating signals which are applied via connections 86 and 88 to hold control circuitry incorporated in sensing circuits 50 and 60. A hold initiating signal from circuit 50 is effective to place line L1 in a hold condition, and similarly a hold initiating signal from circuit 60 is effective to place line L2 in the hold condition. For this purpose, each of circuits 30 and 40 includes a hold bridge network and contacts of a hold relay that are selectively energized by the associated sensing circuits 50 and 60, respectively, as represented by the dotted lines 51 and 63 linking these circuits as shown in FIG. 1.

Connections 59 and 61 between circuit 80 and sensing circuits 50 and 60, respectively, insure that when hold switch S3 is actuated, only that telephone line then connected to the associated station set by the corresponding line relay (either relay 24 or relay 26) will be placed in a holding condition. Line select circuit 80 also provides an automatic disconnect feature, and enables each station to establish a conference call jointly with two or more lines, such as L1 and L2, available at the station. Automatic disconnect occurs when one of the incoming lines is connected to the station set, and that selector switch which is associated with the other line is actuated. The result is that the first mentioned telephone line is automatically "dumped," i.e., disconnected from the station set. A conference call is effected by simultaneously actuating both selector switches so as to override the automatic disconnect operation, and cause both line relays 24 and 26 to operate and thus concurrently connect both incoming lines L1 and L2 to the station set.

Figure 2:
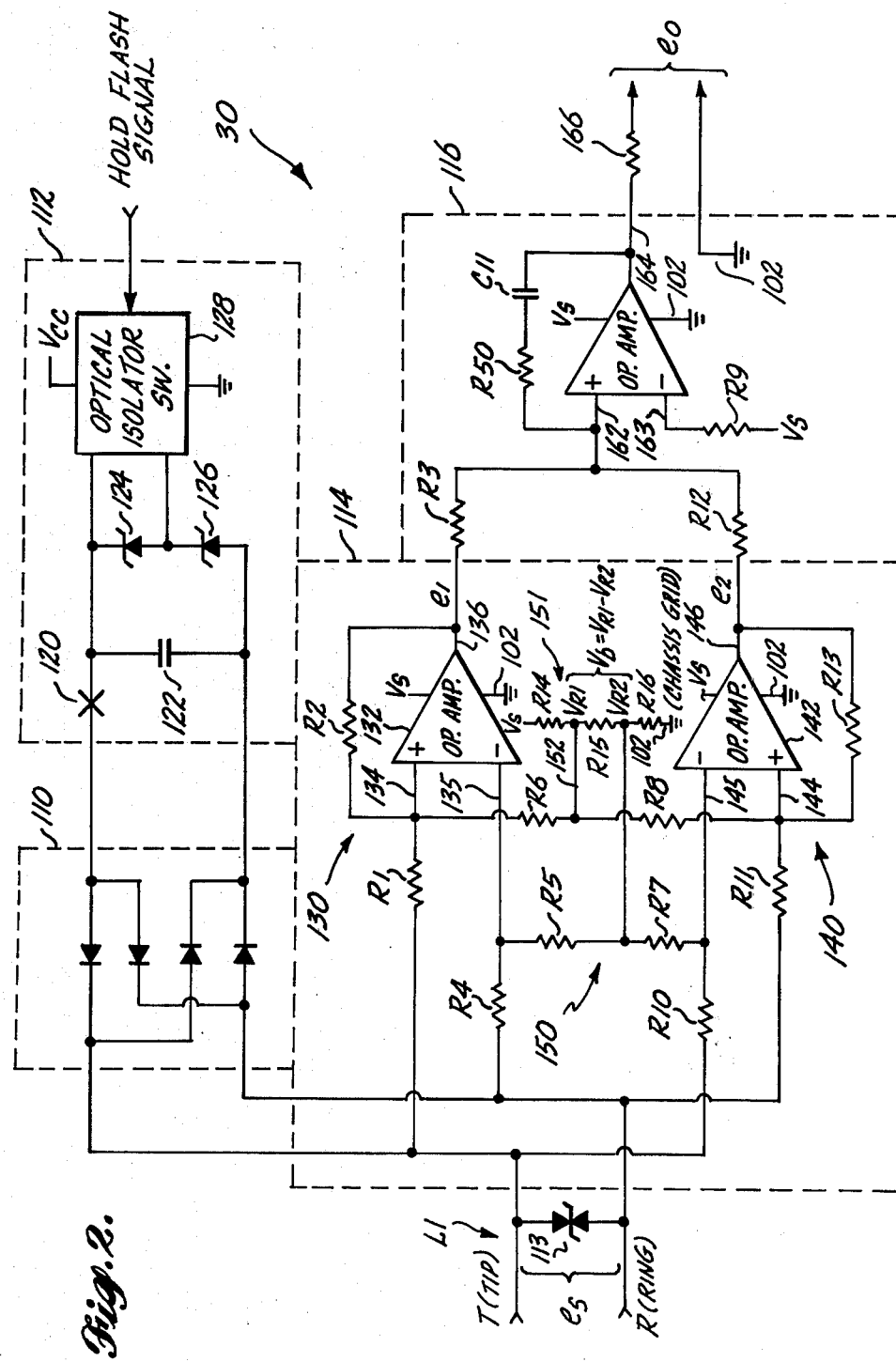
FIG. 2 is a detailed schematic diagram of the interface circuit in accordance with a preferred form of the invention, and in combination with a hold signaling circuit of the key telephone system.

The various control units such as unit 14 of the KTS may be powered from a common DC supply, or by separate supplies at each station. The external supply voltage is in this embodiment a 12-volt DC voltage obtained from an external power supply which is floating, i.e., not referenced to the chassis ground of the associated control unit. The floating DC voltage from the external power supply is applied to a local or internal power source 100 which regulates the DC voltage and produces two levels of positive DC supply voltage, indicated as Vs and Vcc that are referenced to chassis ground 102 of the chassis on which the circuitry of control unit 14 is mounted. The rectification of the external VDC supply voltage insures the proper polarity of Vs and Vcc irrespective of the connection of the leads from the external supply. For reasons which are more fully explained hereinafter in connection with the interface circuit shown in dtail in FIG. 2, the external power supply input to power source 100 has one of its leads AC referenced to earth ground 104 through a capacitor 106. Earth ground 104, which may be an earth ground available at or near the KTS installation, provides a common reference level for operation of control unit 14 in response to the line voltages produced by the equipment at Central Office 12, which are also referenced to an earth ground.

While for the purpose of simplifying the disclosure of the present invention, the construction of control unit 14 is described with reference to the discrete circuit components of the specifications of U.S. Pat. Nos. 4,132,860 and 4,133,985, a currently preferred form of control unit 14 is to employ the LSI processor disclosed in U.S. patent application Ser. No. 038,830 for KEY TELEPHONE SYSTEM HAVING INTERSTATION SIGNALING DURING HOLD CONDITION, filed May 14, 1979, by Harry R. Rasmussen et al. and incorporated by reference herein. More particularly, as disclosed therein, the control and signaling function of sensing circuits 50 and 60, bell transfer circuit 70 and line select circuit 80 are preferably carried out digitally in response to signals developed by interface circuits 30 and 40.

Inasmuch as circuits 30 and 40 of control unit 14 are identical, only circuit 30 will be shown and described in detail. Thus, with reference to FIG. 2, the hold signaling portion of circuit 30 is provided by a full wave diode bridge rectification network 110 and an on-hold signaling network 112. The interface section of circuit 30 includes a balanced, bipolar voltage comparator network 114, and a signal combining network 116. It is observed that both networks 114 and 112 are connected in parallel to the tip and ring conductors of line L1, but that only network 114 is directly connected to L1 while the hold signaling network 112 is coupled to the line through the full wave diode bridge network 110. A varistor 113 is connected across line L1 in the usual manner for protecting control unit 14 and line L1 against voltage surges, caused for example by lightning.

Hold signaling network 112 operates as described in the above-mentioned U.S. Pat. No. 4,132,860 and for this purpose includes a normally open set of hold relay contacts 120, a spike suppressing capacitor 122, a pair of serially connected zenner diodes 124 and 126 and an optical isolator switch 128 operated between on and off impedance conditions by a hold flash signal received from hold flash generator 90 (FIG. 1). Network 110 couples the hold signal generated by network 112 to line L1, insuring that the positive polarity of the voltage on line L1 is always applied to the anode of zenner diode 124 and the negative polarity of the line voltage is applied to the cathode of zenner diode 126. In this manner, the pair of zenner diodes 124 and 126 limit the maximum voltage across the line L1 to the combined breakdown voltages of zenner diodes 124 and 126 when switch 128 is open, and to the breakdown voltage of only zenner diode 126 when switch 128 is closed shunting zenner diode 124. As described in the aforementioned U.S. patent, the switching operation of switch 128 in response to the hold flash signal, produces a fluctuating voltage across the zenner diodes 124 and 126 resulting from a change from the combined breakdown voltages (maximum) to the breakdown voltage of the single diode 126 (minimum). The electrical energy for developing this fluctuating signal on the telephone line is obtained by the Central Office supervisory voltage so that there is no voltage of current injected by network 112 into the telephone line. The hold signal is applied to line L1 only when contacts 120 of the hold relay are closed, and the operation of contacts 120 is governed by the L1 sensing circuit 50 (FIG. 1) again as described more fully in the above-referenced U.S. patent. During the on-hold condition, a relatively low impedance is connected across the telephone line, and in this condition, the impedance and biasing voltage characteristics of diode bridge network 110 do not adversely affect the hold signaling operation. When the line is idle, hold control contacts 120 are open, no current flows through network 110, and thus network 110 does not burden or otherwise interfere with the supervisory voltages on the line.

Comparator network 114 includes first and second comparators 130 and 140 connected in parallel to the tip and ring conductors of line L1. Comparator 130 is formed by an operational amplifier 132 having a positive feedback resistor R2, and input resistors R1 and R4. Feedback resistor R2 is connected between the noninverting input 134 and the output 136 of amplifier 132. A first of the input resistors R1 is connected between the tip conductor of L1 and the noninverting input 134 of amplifier 132, and the second input resistor R4 is connected between the ring conductor and the inverting input 135 of the amplifier. Amplifier 132 is supplied by a DC voltage Vs from power source 100 (FIG. 1) referenced to chassis ground 102.

The second comparator 140 of network 114 includes an operational amplifier 142 and an associated positive feedback resistor R13, and input resistors R10 and R11 to perform the voltage comparison function. Feedback resistor R13 is connected between the noninverting input 144 and the output 146 of the amplifier. Input resistor R11 is connected between the ring conductor of line L1 and the noninverting input 144 of amplifier 142, and in this respect forms the counterpart to input resistor R1 of comparator 130. Similarly, resistor R10 is connected between the tip conductor of line L1 and the inverting input 145 of amplifier 142 and provides the counterpart to input resistor R4 of comparator 130.

An input voltage biasing network 150 is connected to the inverting and noninverting inputs of the respective operational amplifiers 132 and 142 so that the output voltages $e_1$ and $e_2$ at outputs 136 and 146, respectively, are stepped in response to the amplitude of the line voltage $e_s$ across L1, and symmetrical about the zero axis of $e_s$, which depending on the operating condition of the line, can be positive or negative. The response characteristics at outputs 136 and 146 are described in greater detail below. To achieve the stepped, symmetrical response at the comparator outputs, network 150 includes a pair of equal value biasing resistors R5 and R7 connected to the inverting inputs 135 and 145 of the operational amplifiers 132 and 142, respectively, and second pair of equal value biasing resistors R6 and R8 connected to the noninverting inputs 134 and 144 of the amplifiers. The supply voltages for these biasing resistors R5–R8, are obtained from a voltage divider 151 of network 150 formed by resistors R14, R15 and R16 connected in series between supply voltage Vs (see FIG. 1) and chassis ground 102.

The junction between resistors R14 and R15 provides a first reference biasing voltage $V_{R1}$ that is applied over connection 152 and thence through resistors R6 and R8 to the respective noninverting inputs 134 and 144 of operational amplifiers 132 and 142. Similarly, a second reference biasing voltage $V_{R2}$ is obtained from the junction between resistors R15 and R16 and is applied through biasing resistors R5 and R7 to the respective inverting inputs 135 and 145 of operational amplifiers 132 and 142.

The reference biasing voltages $V_{R1}$ and $V_{R2}$ are selected so that output $e_2$ of comparator 140 swings from low to high (passing through a balanced condition at which amplifier 142 is in a linear operating mode) when the line voltage $e_s$ is positive (i.e., polarity not reversed) and decreases in amplitude below a predetermined threshold switching point; and so that output $e_1$ of comparator 130 swings from low to high (passing through a balanced condition at which amplifier 132 is operating in a linear mode) when the line voltage $e_s$ is negative (i.e., polarity reversed) and decreases in magnitude below a threshold switching point, equal in magnitude and opposite in polarity to the above switching threshold of comparator 140. The resulting stepped, symmetrical responses of output voltages $e_1$ and $e_2$ of comparators 130 and 140, are then combined by logic network 116 to form a single output voltage $e_o$ that has two discrete levels, high if both $e_1$ and $e_2$ are high, and low if either or both of signals $e_1$ and $e_2$ are low.

Network 116 includes an operational amplifier 160 connected to perform an AND logic function in response to the discrete level output voltages $e_1$ and $e_2$ from comparators 130 and 140, respectively. The output voltage $e_1$ from output 136 of comparator 130 is connected through a first input resistor R3 to a noninverting summing input 162 of operational amplifier 160, and voltage $e_2$ from output 146 of comparator 140 is connected through a second input resistor R12 to summing input 162. A lowpass filter in the form of series resistor R50 and capacitor C11, is provided in the positive feedback path between output 164 of amplifier 160 and the noninverting input 162. The inverting input 163 of amplifier 160 has a positive reference voltage applied thereto through a biasing resistor R9 connected to Vs of the internal power source 100 (see FIG. 1). The reference voltage applied at input 163 is selected so that amplifier 160 will be turned fully on (saturated in a forward amplification state) only when the output voltage signals $e_1$ and $e_2$ from comparators 130 and 140 are both high.

The output 164 of amplifier 160 is connected through an output resistor 166 to provide the combined, discrete level output signal $e_o$ of the interface circuit 30. Because of the chosen threshold response levels of comparators 130 and 140 of network 114, and the AND logic operation of network 116, output signal $e_o$ will, in general, assume a low logic level when the input line voltage $e_s$ has a magnitude, irrespective of polarity, that is relatively high, representing an idle line (on-hook) condition, and will assume a high logic level when the amplitude of $e_s$, irrespective of polarity, drops below a predetermined threshold, representing a busy (off-hook) condition on the line.

As explained below, the positive feedback provided by resistors R2 and R13 connected about operational amplifiers 132 and 142, respectively, introduce a hysteresis in the switching levels of comparators 130 and 140, so that the precise amplitude at which the line voltage $e_s$ causes a switching change in the output voltages $e_1$ and $e_2$ of these comparators, depends on the direction of change of the input line voltage $e_s$. The hysteresis is intentionally incorporated into comparator network 114 so as to mask unwanted, spurious fluctuations of small amplitude in the line voltage $e_s$.

The precise values of the various components of interface and hold signaling circuit 30 are in general not critical, however, the following considerations apply in the selection of component values. For hold signaling network 112, the values of zenner diodes 124 and 126 are selected in accordance with the disclosure in the above-mentioned U.S. Pat. No. 4,132,860. Briefly, as described therein, the combined voltages of zenner diodes 124 and 126 is selected to provide a maximum hold voltage fluctuation (when switch 128 is open) that allows sufficient loop current to flow in line L1 so as to maintain the line busy connection at the associated Central Office. The minimum line voltage (which occurs when diode 124 is shorted by switch 128) is selected to provide a minimum, but nonzero voltage across the line so as to limit the maximum amount of loop current during a hold condition. In accordance with these criteria, in this embodiment, zenner diode 126 has a breakdown of voltage of 6.2 volts (providing the minimum line voltage) and zenner diode 124 has a breakdown at 15 volts, providing a maximum line voltage of 21.2 volts, and an amplitude swing for the fluctuating hold signal of 15 volts. Capacitor 122 can be of any value sufficient to suppress or minimize the sharp transients that occur on the line due to the periodic opening and closing of switch 128 by the hold flash signal. For example, 10 microfarads has been found suitable for capacitor 122.

For the balanced, bipolar comparator network 114, input resistors R1, R4, R10 and R11 are preferably of equal value, so as to maintain a balanced termination of the tip and ring conductors of line L1, and are preferably of at least one megohm so as to maintain adequate isolation between the interface circuit and the supervisory signaling on line L1. In this embodiment, each of the input resistors R1, R4, R10 and R11 of comparators 130 and 140 have an impedance of 10 megohms. Operational amplifiers 132 and 142 are in this embodiment relatively high gain devices having an impedance at their inputs on the order of 100 kohms. Commercially available operational amplifiers having such an input impedance, and being capable of operating over the audio frequency range are suitable.

The values of the various resistors of biasing network 150 are selected to provide the desired biasing at inputs 134 and 135 of operational amplifier 132, and at inputs 145 and 144 of operational amplifier 142. Also, the values of resistors R5, R6, R7 and R8 which apply the reference voltages $V_{R1}$ and $V_{R2}$ to the operational amplifier inputs are preferably of equal value so as to maintain the balanced impedance termination of the conductors of line L1. Within these criteria, and with the input resistors R1, R4, R10 and R11 set at 10 megohms each, the balanced biasing resistors R5, R6, R7 and R8 are in this embodiment each provided by 1.5 megohm resistors. The bias voltage $V_b$ (equal to $V_{R1}-V_{R2}$) applied across the inputs of operational amplifiers 132 and 142 by resistors R5–R8 is selected so that the amplifiers are nearly balanced at the desired threshold switching levels of the line voltage $e_s$. In this embodiment, given the ratio of the values of the input resistors R1, R4, R10 and R11 to the biasing resistors R5, R6, R7 and R8, a bias voltage $V_b$ across resistor R15 of divider 151 is set at 2.5 volts, and is equal to the difference between the divider voltages $V_{R1}$ and $V_{R2}$. Preferably, to maintain the impedance balance of the various resistors that are effectively terminating the conductors of line L1, the desired bias voltage $V_b$ is obtained across a middle resistor R15 of the voltage divider 151 and the associated outboard resistors R14 and R16 are selected to be equal so that the impedance to chassis ground 102 is essentially the same for both the tip and ring conductors of L1.

Positive feedback resistors R2 and R13 of operational amplifiers 132 and 142, respectively, are selected to provide a certain amount of hysteresis as these amplifiers are switched between their forward gain saturated state (noninverting inputs 134 and 144 more positive than the inverting inputs 135 and 145), and their cutoff state (noninverting inputs 134 and 144 are more negative than inputs 135 and 145). The hysteresis, as described below in the section on operation, serves to mask unwanted, spurious fluctuations of small amplitude in the voltages at the inputs to comparators 130 and 140. For this purpose, positive feedback resistors R2 and R13 are selected in this embodiment to each have a value of 15 megohms.

For signal combining and logic network 116, a greater degree of freedom is permitted in the selection of the various component values inasmuch as the output signal voltages $e_1$ and $e_2$ from network 114 are essentially logic signals having discrete, relatively high and low levels. Thus, input resistors R3 and R12 are selected with respect to biasing resistor R9 and the reference voltage $V_s$ so that when both $e_1$ and $e_2$ are at a logic high, the noninverting input 162 of operational amplifier 160 is more positive than the inverting input 163. Such a condition disposes operational amplifier 160 in a positive saturated condition such that output 164 is at a logic high as is the output signal $e_o$ of circuit 30. If on the other hand, either one or both of output signals $e_1$ and $e_2$ is at a logic low, then the noninverting input 162 will be less positive than the inverting input 163 causing operational amplifier 160 to be turned off and hence causing output 164 and $e_o$ to be at a logic low. Given these operating requirements, the values of each of resistors R3 and R12 are in this example, 200 kohms, and the supply voltage $V_s$ is 8 volts while resistor R9 is 150 kohms.

The feedback elements, i.e., resistor R50 and capacitor C11, associated with operational amplifier 160 are selected to provide a lowpass filter for slowing the switching operation of amplifier 160 as described more fully below. For this purpose, and by way of example, resistor R50 in this embodiment has a value of 180 kohms and capacitor C11 has a value of 0.027 microfarads.

Output resistor 166 serves as a current limiting buffer impedance and in this embodiment is provided by a 4.7 kohms resistor.

Operation

Before considering the response of networks 114 and 116 to the various supervisory and information signals on line L1, it is helpful to describe the individual input-/output characteristics of the principal components of these networks. Thus, first with reference to the diagram of FIG. 3a, the voltage input/output characteristic of comparator 130 is shown in which the line voltage $e_s$ is plotted along the horizontal axis, and the comparator output voltage $e_1$ is plotted along the vertical axis. Positive values of $e_s$ (on the right-hand side of the vertical axis) correspond to normal, nonreversed line voltages in which the tip conductor is referenced to earth ground at the Central Office and is relatively positive with respect to a negative-to-earth ground voltage on the ring conductor. Conversely, negative values of $e_s$ (to the left-hand side of the vertical axis) indicate a reversed polarity line voltage in which the tip and ring conductors have been reversed at Central Office such that ring is referenced to earth ground and is relatively positive with respect to a negative-to-earth ground tip voltage. Under normal, nonreversed conditions, the line voltage $e_s$ varies from approximately +48 volts (tip to ring) for an idle line, to about +15 or less for a busy line. When the line voltage polarity is reversed, such as for supervisory purposes, the opposite polarity conditions prevail, in which $e_s$ varies between a tip voltage of −48 volts (idle) to less than −15 (busy) relative to the ring conductor.

Thus, in FIG. 3a, so long as a normal, nonreversed polarity condition prevails the line voltage $e_s$ is positive and output signal $e_1$ of comparator 130 remains at its relatively high discrete level. This is true regardless of the magnitude of the line voltage $e_s$. When the polarity of $e_s$ on L1 is reversed and $e_s$ becomes negative (i.e., the waveform to the left of the vertical axis), the following switching conditions will occur depending upon the magnitude of $e_s$. For an idle line, with $e_s$ negative, the tip conductor will be at approximately −48 volts relative to the ring and thus to the far left-hand side of the vertical axis in FIG. 3a. The high, reversed polarity voltage in this condition, is applied through resistors R1 and R4 of comparator 130 so as to swamp the positive bias applied to the inputs 134 and 135, causing the operational amplifier 132 to be cutoff, and hence causing $e_1$ at the output 136 to assume a discrete low voltage condition at or near chassis ground 102. When line L1 changes from idle to busy, the tip conductor voltage drops in magnitude from −48 volts to under −16 volts relative to the ring conductor. Hence the negative value of $e_s$ moves from left to right as viewed in FIG. 3a, causing $e_1$ to go high as the magnitude of $e_s$ crosses the switching threshold of −16 volts and is no longer sufficient to overcome the input bias on operational amplifier 132. So long as the line remains busy, $e_s$ will be relatively low and negative and $e_1$ will stay high. When the line voltage $e_s$ increases in magnitude from less than −16 volts toward the idle condition of −48 volts, the positive bias of operational amplifier 132 provided by feedback resistor R2 causes a hysteresis in the switching point of comparator 130. Output signal $e_1$ does not switch low until $e_s$ moving from right to left, increases in magnitude to a threshold of −20 volts at which $e_1$ again switches low and remains there during the line idle condition. Thus, a 4 volt hysteresis is provided in the switching of comparator 130, as the comparator is cycled between its discrete operating modes.

The operation of comparator 140 is identical to, but opposite in phase from that of comparator 130. Thus, in FIG. 3b, the output $e_2$ of comparator 140 is high so long as $e_s$ is negative (i.e., reversed polarity condition), regardless of the magnitude of $e_s$. When $e_s$ is positive (nonreversed) and relatively large, e.g., +48 volts, respresenting an idle line, then the output signal $e_2$ is low. When the magnitude of a positive $e_s$ drops below +16 volts, this voltage, applied in reverse phase to the inputs of operational amplifier 142 is insufficient to overcome the input bias received from network 150 and output signal $e_2$ of comparator 140 switches high. When $e_s$ swings in the opposite direction from low to high, and hence moves from left to right as viewed in FIG. 3b, positive feedback provided by resistor R13 about operational amplifier 142, produces a hysteresis of approximately 4 volts and causes comparator 140 to switch at a threshold of $e_s$ = +20 volts.

The resulting discrete level output signals $e_1$ and $e_2$ from the comparators are combined by network 116 as shown by the waveform diagram in FIG. 3c. In that diagram, the output signal $e_o$ of network 116 and hence for the entire circuit 30, is at a discrete, relatively high logic level only when both comparator output signals $e_1$ and $e_2$ are high. More specifically, the reference voltage $V_s$ applied through input resistor R9 to the inverting input 130 of operational amplifier 160, is selected so that output 160 from the amplifier will be normally at or near ground potential, unless the voltage at the noninverting input 162, resulting from the summation of the individual comparator output voltages $e_1$ and $e_2$, exceeds the reference voltage at input 163. This occurs only when both $e_1$ and $e_2$ are high as shown in FIG. 3c.

The lowpass filtering provided by feedback resistor R50 and capacitor C11, causes a pulse stretching operation of network 116 in response to rapid cycling of the levels of comparator output signals $e_1$ and $e_2$, such as occurs during certain types of superimposed ringing as described below.

The operation of circuit 30 will now be considered in response to each of the various supervisory signal conditions including idle, busy, holding and superimposed ringing:

Idle Condition

So long as line L1 is in an idle condition, the magnitude of $e_s$ will be in excess of approximately 22 to 24 volts and will nominally be around 48 volts. The polarity of $e_s$ will be either positive (normal, nonreversed) in which the ring conductor is at approximately $-48$ volts with respect to tip, or negative (polarity reversed) in which the tip conductor is at approximately $-48$ volts with respect to ring. From the waveform diagrams of FIGS. 3a and 3b, it will be appreciated that in either the nonreversed or reversed polarity conditions, one of the comparator output signals, $e_1$ or $e_2$ will be low. After processing by network 116, the output voltage $e_o$ is thus low, irrespective of the polarity of the idle line.

Busy Condition

When the line voltage $e_s$ drops substantially to the relatively lower magnitude associated with a busy (off-hook) condition in response to a terminating impedance being placed across the tip and ring conductors, the 16 volt switching threshold of either comparator 130 or comparator 140 will be crossed, depending upon the polarity of the line voltage $e_s$. Responsively, the associated output signal, $e_1$ or $e_2$ will go to its logic high level, resulting in both output signals $e_1$ and $e_2$ being high. Hence, the output signal $e_o$ for network 116 also goes high. This busy condition is represented by the bipolar line voltage range in FIG. 3c between $e_s = -16$ volts and $e_s = +16$ volts.

Hold Condition

During a hold condition as described in the above-mentioned U.S. Pat. No. 4,132,860, hold signaling network 112 produces a fluctuating voltage on line L1, by means of periodically shunting zenner diode 124. Thus fluctuating hold voltage signal in the present case, swings between a low magnitude of 6.2 volts representing the breakdown voltage of zenner diode 126 by itself, and a high of 21.2 volts, representing the serially combined breakdown voltages of diodes 124 and 126.

As shown in FIG. 3c, this fluctuating hold signal amplitude, irrespective of its polarity, causes the output signal $e_o$ to switch high as the line voltage $e_s$ drops below the 16 volt threshold on the low going portion of the hold signal waveform, and to switch low as $e_s$ swings above the 20 volt hysteresis threshold on the high going portion of the hold signal waveform. The response of network 116 is the same, irrespective of the polarity of the applied line voltage $e_s$, because of the existence of the full wave rectification network 110 interposed between line L1 and the hold signaling network 112. Thus, in response to the fluctuating hold signal, $e_o$ switches, at the hold flash rate, between its discrete high and low levels providing a detectable, essentially square wave output signal.

While in the foregoing description, it is assumed that the fluctuating hold signal is generated by network 112, which is part of the control unit that includes networks 114 and 116, it will be understood that the hold signal may also originate from other, remote control units equipped with an identical hold signaling network 112, as more fully described in U.S. Pat. No. 4,132,860. Irrespective of the origin of the hold signal, the response of comparator network 114 and signal combining network 116 are the same as described above.

Although under ideal signal conditions, and using idealized components that make up comparators 130 and 140, it would be possible to use comparators having a single switching threshold, irrespective of the direction of crossover, it is preferable to construct comparators 130 and 140 with the positive feedback hysteresis. By using a hysteresis of approximately 4 volts as described above (the difference between the 20 volt and 16 volt switching threshold), the hysteresis effectively masks small, spurious voltage changes at the inputs to the comparators. These spurious signals can result from the presence of 60 Hz noise that inevitably is picked up by telephone lines. The 60 Hz noise results in longitudinals on the line which are converted to spurious voltages at the comparator inputs by slight mismatches of the various impedances elements connected to the inputs of amplifiers 132 and 142. While under some signal conditions, it is possible to omit the positive feedback provided by resistors R2 and R13 of comparators 130 and 140, respectively, and consequently eliminate the above-described hysteresis, the currently preferred embodiment incorporates the hysteresis for reliability purposes and to permit the use of less precision components. It is observed that a hysteresis of approximately 4 volts in this instance, does not prevent effective detection of the hold signal, which has an amplitude swing of approximately 15 volts. By using a hysteresis that is sufficiently large to mask the above-mentioned noise, and yet is smaller than the amplitude of the hold signal, and by appropriately positioning the hysteresis intermediate the limits of the hold signal amplitude swing, effective reception of the hold signal is insured.

Superimposed Ringing Condition

The present embodiment is constructed to sense a superimposed ringing signal on line L1 and produce a responsive pulse train signal at the output of network 116. Superimposed ringing is typically an AC signal of 120 volts peak-to-peak amplitude but may range from about 60 to 210 volts peak-to-peak. It has a frequency that is typically 20 or 30 Hz but in general can have a range of from 18 to 66 Hz. The AC ringing signal is superimposed on the idle supervisory voltage which as mentioned above is either $-48$ volts at the ring conductor relative to earth ground at the tip or, $-48$ volts at the tip conductor relative to earth ground at the ring. In either case, it will be apparent that the line voltage $e_s$, with superimposed ringing, will produce a signal that passes through the switching thresholds of networks 114 and 116. Thus, depending upon the waveform shape of the ringing signal, comparator network 114 and signal combining network 116 will exhibit transient changes in the signal levels of $e_1$, $e_2$ and $e_o$ in response to each swing of the line voltage $e_s$ with superimposed ringing. For a ringing signal that varies gradually between the peak voltages, such as a sinusoidal or triangular waveform, the response characteristics of networks 114 and 116 will produce an output signal $e_o$ that consists of a pulse of detectable width for each positive-to-negative and negative-to-positive cycle of the superimposed ringing signal. The resulting signal is a pulse train having a pulse rate that is twice the ringing frequency. The frequency doubling enables the downstream processing circuitry to readily discriminate between fluctuations of the output signal $e_o$ caused by the hold flash signal, and the doubled and hence substantially higher frequency pulse rate resulting from a ringing condition.

In those applications in which the superimposed ringing signal is a square wave, the transitions of the line voltage waveform cause very rapid fluctuations in the comparator output signals $e_1$ and $e_2$, and hence in the combined output signal $e_o$. The lowpass filtering provided by resistor R50 and capacitor C11 in feedback about amplifier 160 stretches each output pulse therefrom that occurs in response to the sharp rise and fall time of the square wave ringing signal. The thusly stretched output pulse now has a detectable width for reliable downstream signal processing. In this embodiment, resistor R15 and capacitor C11 are selected to provide a lowpass time constant that passes frequencies of less than about 800 Hz.

During ringing on lines L1 and/or L2, there is a tendency for the large amplitude ringing voltage to modulate the local power source 100 through the L1 biasing network 150, or the corresponding biasing network in circuit 40 associated with line L2. To smooth out such modulation and prevent consequent mistriggering of comparator network 114, a filter capacitor 106 (FIG. 1) passes such AC distortion modulation to earth ground.

Thus, it will be appreciated that comparator network 114 comprises a pair of opposite phased operational amplifier comparators 130 and 140 that provide a symmetrical, bipolar response, similar to full wave rectification, to accommodate polarity reversals of the supervisory line voltage $e_s$. Moreover, the inputs of comparators 130 and 140 are biased by network 150 so as to provide comparison thresholds that enable network 114 to effectively detect and discriminate between the Central Office supervisory signals representing idle, busy and ringing conditions, and a holding signal produced locally by a key telephone system of the type disclosed in U.S. Pat. No. 4,132,860. The input and biasing impedances associated with comparators 130 and 140 provide an extremely high input impedance to the interface circuit for isolating equipment downstream thereof from the Central Office switching equipment. Since a diode rectification bridge is not required at the input of the interface portion of circuit 30, there is not this constraint on the upper limit of the impedance values of the input resistors R1, R4, R10 and R11.

While only a particular embodiment has been disclosed herein, it will be readily apparent to persons skilled in the art that numerous changes and modifications can be made thereto including the use of equivalent means, devices and method steps without departing from the spirit of the invention. For example, although comparator and signal combining networks 114 and 116, respectively, are disclosed as interface circuits for coupling a telephone line L1 to a key telephone system having special hold signaling feature, it will be apparent that the interfacing capability of network 114, and the associated network 116, may be employed in numerous other applications where there is a need to provide a high impedance isolation between the telephone line and signal utilizing equipment responsive to supervisory and information signals present on the telephone line.

The embodiments of the invention in which an exclusive property or privilege is claimed are defined as follows:

1. An interface circuit for coupling the tip and ring conductors of a telephone line to a signal utilizing means that is responsive to line voltage supervisory and information signals, including line voltage polarity reversals, comprising:

first and second terminals, said first terminal adapted to be connected to the tip conductor and said second terminal adapted to be connected to the ring conductor such that the line voltage across the tip and ring conductors will be applied to said first and second terminals;

first and second voltage comparator circuit means each being formed by an operational amplifier having an inverting input and a noninverting input and an output, said inputs of said first and second comparator circuit means connected to said first and second terminals in parallel and in an opposite phase relationship such that said first comparator circuit means is effective to respond to changes in the magnitude of the line voltage when it has a relative reversed polarity, and said second comparator circuit means is effective to respond to changes in the magnitude of the line voltage when it has a normal non-reversed polarity; and signal combining circuit means connected to said outputs of said first and second comparator circuit means for producing a combined output signal for receipt by the signal utilizing means.

2. The interface circuit of claim 1 wherein said first and second comparator circuit means each has corresponding first and second discrete electrical states at its respective output and is responsive to the polarity and magnitude of a voltage applied across its respective inverting and noninverting inputs, and further comprising biasing circuit means for biasing said inverting and noninverting inputs of said first comparator circuit means so that the electrical state at said output thereof undergoes a transition between said first and second discrete electrical states when the line voltage crosses a predetermined negative threshold value, and wherein said biasing circuit means is also connected to said inverting and noninverting inputs of said second comparator circuit means so that the electrical state at said output thereof undergoes a transition between said first and second discrete electrical states when the line voltage crosses a predetermined positive threshold value.

3. The interface circuit of claim 2 wherein said biasing means includes means for causing said predetermined negative threshold value to be equal in magnitude but opposite in polarity to said predetermined positive threshold value.

4. The interface circuit of claim 3 wherein the line voltage communicates supervisory signals including an idle voltage of either polarity and of predetermined magnitude range for signaling an idle condition and a busy voltage of either polarity and of predetermined and lower magnitude range, relative to that of said idle voltage, for signaling a busy condition; said biasing means includes means for causing said magnitude of said predetermined positive and negative threshold values to lie between the ranges of the idle and busy voltages on the line.

5. The interface circuit of claim 2 wherein said signal combining circuit means comprises logic circuit means having an output at which said combined output signal assumes a first signal condition when the signals at the outputs of said first and second comparator means are both at their first discrete states, and said combined output signal assumes a second signal condition when either of said signals at said outputs of said comparator means are at their second discrete state.

6. The interface circuit of claim 2 wherein said signal utilizing means comprises a control unit for one station of a multiple station key telephone system, and said control unit in turn comprises a hold signaling circuit means for causing the line voltage, when it is of reversed polarity, to fluctuate above and below said predetermined negative threshold value, and for causing the line voltage when it is of normal, non-reversed polarity to fluctuate above and below said predetermined positive threshold value so that said output of said first comparator circuit means switches between said first and second discrete electrical states in response to said hold signaling circuit means when the line voltage is of reversed polarity, the wherein said output of second comparator circuit means fluctuates between said first and second discrete electrical states in response to said hold signaling circuit means when the line voltage is normal, non-reversed polarity.

7. The interface circuit of claim 6 wherein said hold signaling circuit means comprises a voltage breakdown device and switching means for periodically shunting said breakdown device, and a full wave rectification means connecting said voltage breakdown device and switching means across the tip and ring conductors of the line in parallel with said first and second comparator means.

8. The interface circuit of claim 6 wherein said signal combining circuit means comprises pulse stretching means for stretching transient changes between said signal conditions of said combined output signal.

9. The interface circuit of claim 2 wherein said biasing circuit means comprises a voltage divider network means that develops a biasing voltage which is applied to said inputs of said comparator means, said divider network means being connected across a voltage source and having an intermediate impedance across which said biasing voltage is developed and having balanced terminal impedances connected at opposed ends of said intermediate impedance so as to maintain a balanced impedance termination for the tip and ring conductors of the telephone line when connected to said first and second terminals.

10. The interface circuit of claim 1 wherein each of said first and second comparator circuit means comprises a positive feedback means so that changes in the discrete electrical states at said outputs of said first and second comparator circuit means exhibit hysteresis in response to variations of the line voltage about said predetermined threshold values.

11. The interface circuit of claim 1 wherein said inputs of said first and second comparator circuit means comprise series resistances of substantially equal value so as to provide balanced impedance termination of the telephone line when connected to said first and second terminals.

12. In a key telephone system of the type being a control unit for each of a plurality of phone stations, said control unit having first and second pairs of line input terminals adapted respectively for connection to first and second telephone lines for selective connection and disconnection of such lines to a phone set at each such station, and in which said control unit is of the type having first and second line condition sensing means and associated indicator means for sensing and indicating conditions of idle, busy and hold on each of the first and second telephone lines, and having first and second hold control means including a hold signal generator for selectively applying a hold control signal to said first and second lines, respectively, in response to a manually operable hold select switch to thereby establish a hold condition on either or both of the lines during which hold condition the associated line is disconnected from the telephone set, the improvement in said key telephone system being an interface circuit in said control unit for connecting at least the first of said telephone lines to said first line condition sensing means, said interface circuit comprising:

first and second comparator means each having input means and an output means, said input means of said first and second comparator means connected to the first pair of said line input terminals in parallel and in opposed phase relation; and signal combining means connected to said output means of said first and second comparator means for producing a combined output signal for receipt by said first line condition sensing means of said control unit.

13. The improvement in the key telephone system of claim 12, wherein said first and second comparator means are each formed by an operational amplifier and each produces a signal at its respective output means that changes between first and second discrete levels depending upon the polarity and magnitude of a voltage applied at the respective input means, and further comprising biasing circuit means for biasing said input means of said first comparator means so that the signal at the corresponding output means undergoes a change between said first and second discrete levels when the line voltage crosses a predetermined negative threshold value, and wherein said biasing circuit means is also connected to said input means of said second comparator means so that the signal at the corresponding output means undergoes a change between said first and second discrete levels when the line voltage crosses a predetermined positive threshold value.

14. The improvement in the key telephone system of claim 13, wherein said biasing means comprises means for causing said predetermined positive and negative threshold valves to be equal in magnitude but opposite in polarity.

15. The improvement in the key telephone system of claim 14, wherein the first telephone line has thereon an idle voltage of either polarity and of a predetermined magnitude range for signaling said idle condition, and assumes a busy voltage of either polarity and of lower magnitude range relative to that of said idle voltage for signaling a busy condition, and wherein said biasing means includes means for causing said magnitude of said positive and negative threshold values to lie between said predetermined ranges of said idle and busy voltages.

16. The improvement in the key telephone system of claim 15, wherein said hold control signal on the first line is a varying voltage signal that has maximum and minimum levels, said maximum level of said hold control signal being of a voltage on the line less than said predetermined range of said idle voltage, and wherein said biasing means includes means for causing said magnitude of said positive and negative threshold values to lie between said maximum and minimum levels of said hold control signal.

17. A control unit for one station of a multiple station key telephone system in which the control unit has first and second terminals adapted for connection to the tip and ring conductors, respectively, of a telephone line and has controlled switching means for selectively connecting said first and second terminals, and hence the telephone line, to the associated station, and in which the control unit includes line condition sensing means for sensing line voltages, of either relatively non-reversed or reversed polarities, representing idle, busy and hold conditions, and wherein the control unit includes an interface circuit comprising:

first and second voltage comparator circuit means, each being formed by an operational amplifier and each having an inverting input, a non-inverting input, and an output that assumes either a first or second discrete electrical state, said inputs of said first and second comparator circuit means being connected to said first and second terminals in parallel and an opposite phase relationship with respect to said inverting and non-inverting inputs such that said first comparator circuit means is effective to respond to changes in the magnitude of the line voltage when it is of said reversed polarity, to alternately assume said first and second discrete electrical states at the associated output, and such that said second comparator circuit means is effective to respond to changes in the magnitude of the line voltage when it is of said non-reversed polarity to alternately assume said first and second discrete electrical states; and, signal combining circuit means connecting said outputs of said first and second comparator circuit means to said line condition sensing means of the control unit.

* * * * *

UNITED STATES PATENT AND TRADEMARK OFFICE
CERTIFICATE OF CORRECTION

PATENT NO. : 4,323,734

DATED : April 6, 1982

INVENTOR(S) : Gene A. Kimzey

It is certified that error appears in the above-identified patent and that said Letters Patent are hereby corrected as shown below:

Column 9, line 18: "and" second occurrence is changed to --are--.

Column 18, line 9: "being" is changed to --having--.

Signed and Sealed this

First Day of June 1982

[SEAL]

Attest:

GERALD J. MOSSINGHOFF

Attesting Officer     Commissioner of Patents and Trademarks